United States Patent [19]

Noble

[11] Patent Number: 5,006,871
[45] Date of Patent: Apr. 9, 1991

[54] IMAGE RECORDING SYSTEM AND METHOD

[75] Inventor: Stephen A. Noble, Rochester, N.Y.

[73] Assignee: Eastman Kodak Company, Rochester, N.Y.

[21] Appl. No.: 528,000

[22] Filed: May 23, 1990

[51] Int. Cl.⁵ .................. G03B 29/00; G03B 7/00; G03B 15/05; H04N 5/225

[52] U.S. Cl. ..................... 354/76; 354/412; 354/145.1; 358/909

[58] Field of Search .......... 358/909, 906, 209, 213.13, 358/213.19, 225, 278; 354/75, 76, 432, 412, 145.1, 413

[56] References Cited

U.S. PATENT DOCUMENTS

| | | | |
|---|---|---|---|
| 4,788,565 | 11/1988 | Masuda et al. | 354/75 |
| 4,805,037 | 2/1989 | Noble et al. | 358/335 |
| 4,831,450 | 5/1989 | Sato et al. | 358/209 |
| 4,841,359 | 6/1989 | Hawkins et al. | 358/76 |
| 4,862,280 | 8/1989 | Iida et al. | 358/229 |

*Primary Examiner*—W. B. Perkey
*Assistant Examiner*—Jae N. Noh
*Attorney, Agent, or Firm*—Francis H. Boos, Jr.

[57] ABSTRACT

A system for simultaneous recording of a flash image on photographic film and video cameras in which flash operation during transfer of image out of the image sensor in the video camera is avoided by means of a simple synchronizing circuit. The synchronizing circuit generates a flash valid signal which allows the flash to be initiated only during a limited portion of the video field signal ending sufficiently far in advance of the next vertical blanking interval to assure that any flash illumination will be completed before the beginning of the next vertical blanking interval in which the video image transfer process occurs.

7 Claims, 2 Drawing Sheets

IMAGE RECORDING SYSTEM AND METHOD

FIELD OF INVENTION

This invention relates to image recording systems, and more particularly to an image recording system comprising a video camera and a photographic film camera synchronized to capture substantially identical images of a subject during a single flash illumination.

BACKGROUND OF INVENTION

It is well known to be desirable to simultaneously record substantially identical photographic film and electronic video images of a subject. This is particularly useful in portrait photography, although other photographic situations may equally benefit from this capability. The recorded video images can be used, for example, as electronic "proofs" of the picture composition before the expense of developing and printing of the photographic negatives is incurred The use of flash illumination is required for most indoor and some outdoor photographic opportunities. During such flash exposure, the film camera lens remains open for a predetermined period of time, while the flash illumination is provided during a window of time within this predetermined period. Because the flash illumination substantially entirely defines the exposure onto the photographic film, and because the flash illumination time is short, the operation of the film and video cameras must be carefully synchronized to obtain substantially identical images.

U.S. Pat. No. 4,805,037, Noble et al, describes one form of synchronization system in which the synchronization is such that when the film camera captures a photographic image of the subject, the video camera captures substantially the same view of the subject as an image frame comprised of two consecutive interlaced video fields, the flash illumination being substantially entirely and equallY distributed between the two fields of video information. The capturing of the video image is accomplished by inhibiting, during the flash illumination, any transfer of information from the image sensor in the video camera. Upon termination of the flash illumination, the next two video fields are transferred to provide a full video frame of the subject of interest. Although satisfactory for its intended purpose, this arrangement requires modification of a conventional video camera to provide means to inhibit the image transfer process and thus adds undesirable complexity and cost to the system.

It is therefore an object of the present invention, to provide a method and system for recording images of a subject in electronic and photosensitive mediums in which the film and video cameras are synchronized to capture substantially identical film and full frame video images with a single flash illumination.

It is another object of the present invention to provide a method and system of image recording system allowing simultaneous capture of flash illuminated film and video images of a subject that is simple and inexpensive to implement and does not require modification of conventional video camera structure.

It is yet another object of the invention to provide a method and system of the type described wherein the flash illumination can be initiated in a random manner with respect to the operation of the video components of the system while maintaining full flash illumination distribution across just two successive video fields.

SUMMARY OF INVENTION

Thus, in accordance with the invention, there is provided a system for simultaneously recording images of a subject in electronic and photosensitive mediums comprises photographic camera means for capturing a photographic image of the subject on the photosensitive medium, the photographic camera means including means for initiating a flash request signal. The system of the invention also comprises a video camera for generating a video signal comprised of alternating video image fields and vertical blanking intervals, the camera including solid state imaging means for capturing a video image of the subject and means for processing the captured image information from the imaging means during the vertical blanking intervals into successive fields of video image signals The system also includes means for illuminating the subject with a flash illumination of a predetermined maximum duration and means for separating vertical blanking signals from the camera video signal The system of the invention further includes means responsive to the seParated vertical blanking signals for enabling initiation of the flash illumination only during a limited time interval following each successive vertical blanking interval, the limited time interval ending at a point in the video signal image field that assures that the maximum duration flash illumination of the subject will be substantially completed before processing of the captured image from the image means is initiated in the next successive vertical blanking interval.

In the method of the invention, substantially simultaneous recording of images on electronic and photosensitive mediums with a single flash illumination comprises, in part, the steps of initiating the capture of a photographic image of a subject on a photosensitive medium and generating a flash request signal to initiate a flash illumination of predetermined maximum duration of the subject to be effective during recording of the photographic image. At the same time, a video image of the subject is captured on an electronic image sensor of a video camera wherein processing of the captured image into a video signal is initiated during vertical blanking intervals between successive fields of video image signals.

According to a particular feature of the invention, the flash illumination is synchronized with the video signal by generating a flash valid signal in response to video blanking intervals separated from the video camera signal, the flash valid signal being effective only during a limited time interval in a video image field that assures the flash illumination on the subject will be substantially completed prior to processing of the sensor image during the next successive vertical blanking interval. The subject is then illuminated with said flash illumination in response to simultaneous coincident occurrence of the flash valid and flash request signals.

DETAILED DESCRIPTION

Figure 1:
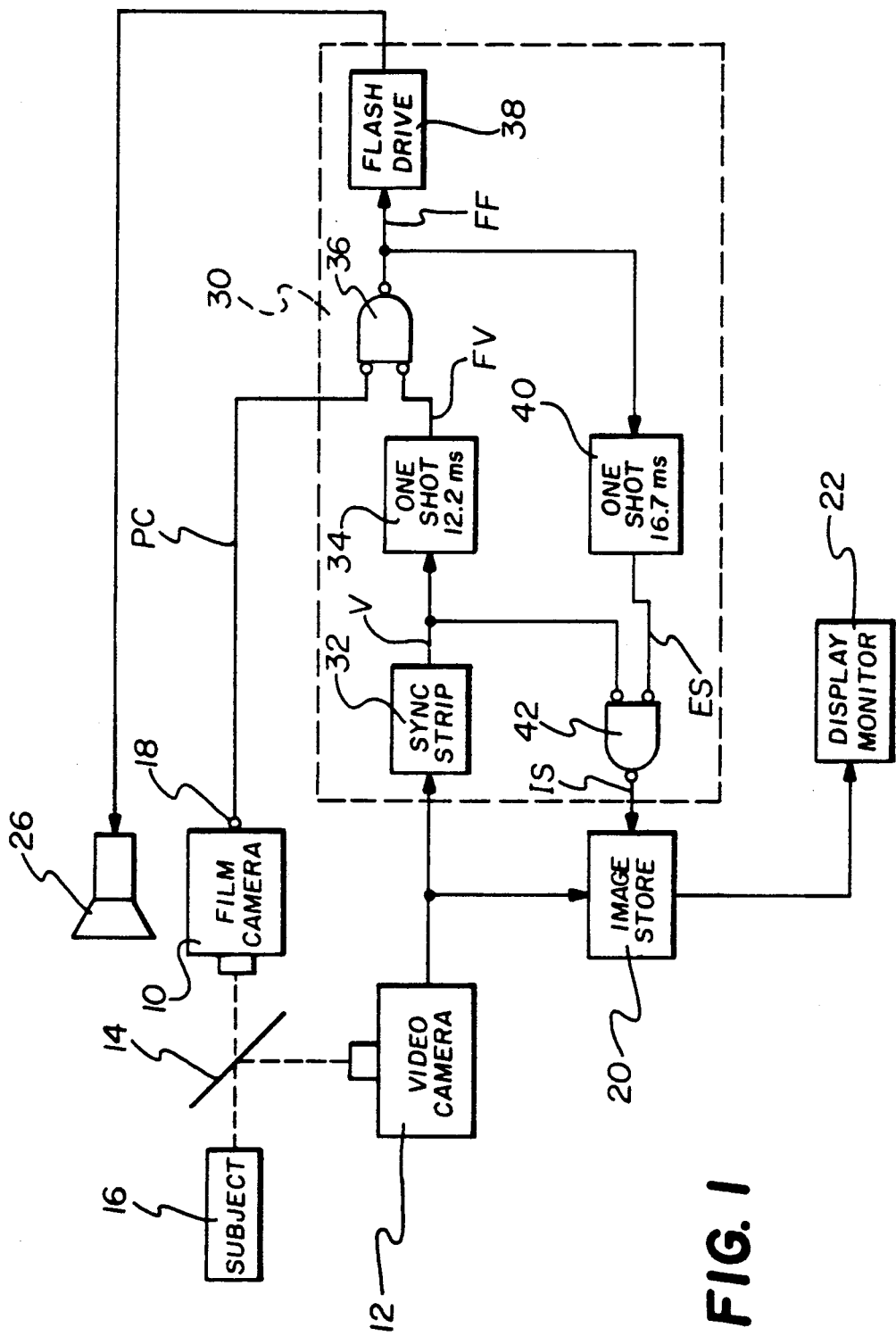
FIG. 1 is a block diagram of an image recording system constructed in accordance with the present invention.
Figure 2:
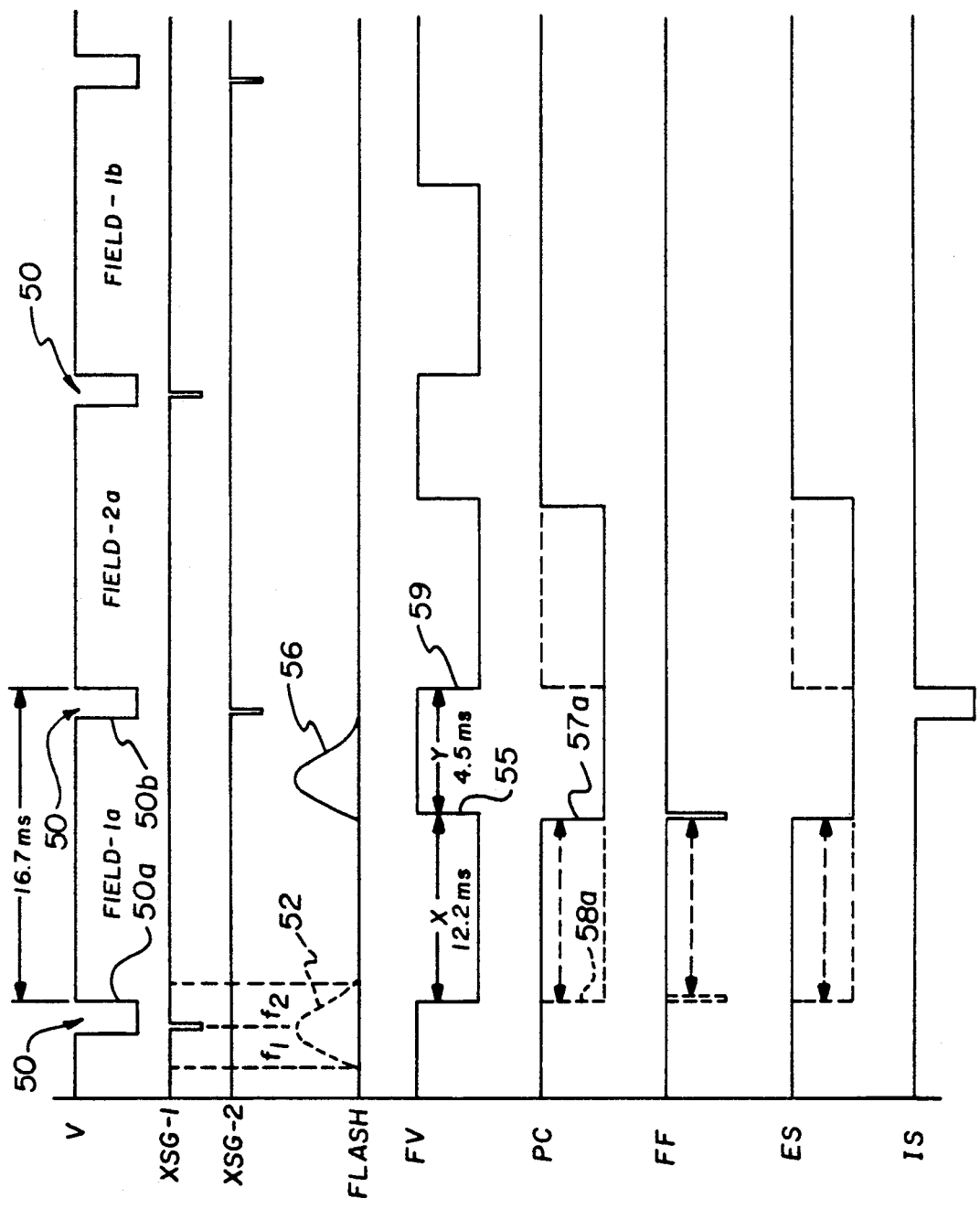
FIG. 2 is a timing diagram showing various signal conditions for the system of FIG. 1.

Referring now jointly to FIGS. 1 and 2, an image recording system is shown which includes photographic film camera 10 and a video camera 12, both of conventional construction, with a beamsplitter 14 situated to direct light reflected from a subject 16 to both of the cameras 10 and 12. With such an arrangement, substantially identical images of subject 16 are simultaneously directed to the cameras. Alternatively, the beamsplitter 14 may be omitted and cameras 10 and 12 aimed directly at the subject 16. Film camera 10 is conventionally Provided with a "PC" output terminal 18 for supplying a flash request electrical signal which is asserted when the film gate in the camera is completely opened and is deasserted when the film gate begins to close.

The video camera 12 typically includes a solid state imaging device for capturing the video image of the subject 16 and further includes means for processing the captured video image into successive fields of video signals separated by vertical blanking intervals. The timing of initiation of processing the image into video signal fields is controlled by one or more internal "XSG" signals that occur during the vertical blanking intervals of the composite video signal. The details of this operation are well known in the art and are generally described in U.S. Pat. No. 4,805,037, the disclosure of which is incorporated herein by reference.

The video output signal from video camera 12 is furnished to image store apparatus 20 which operates in well known manner in response to an "image store" signal IS from synchronizing circuit 30 to store the video image signal, for example on still video floppy disks, for subsequent display on a display monitor 22. As is well known, the video image signal may be stored as a single non-interlaced field of information or, more typically, as alternating fields of interlaced scan lines. In the case of interlaced fields, either a single field or, more preferably, a complete frame of two successive interlaced fields may be stored.

The image recording system also includes flash apparatus 26 which operates in response to a "flash fire" signal FF from synchronizing circuit 30 to provide flash illumination of subject 16. When fired, flash apparatus 26 is energized to illuminate the subject typically for a predetermined maximum duration which may be on the order of 1-3 ms, as is normal with most professional studio strobe units.

In accordance with a particular feature of the invention, the image recording system further includes a synchronizing circuit 30 which operates to synchronize the operation of the flash apparatus 26 to assure that the flash is not being energized at the time that the image on the imaging device in video camera 12 is being processed into video signal information. To this end, synchronizing circuit 30 includes a sync strip circuit 32 which separates the vertical blanking signal V from the video camera output for application to a one-shot multivibrator circuit 34. In the system of FIG. 1, the one-shot circuit 34 is so designed as to be triggered by the trailing edge of the vertical blanking signal V to produce a "flash valid" signal FV that extends from the end of the previous vertical blanking signal to a point in the video field signal that is just short of the beginning of the next video blanking signal. The flash valid signal FV from one-shot circuit 34 and the PC signal from film camera 10 are coupled to separate inputs of an AND gate 36 such that the low active time coincidence of the PC flash request signal and the flash valid signal FV produces a "flash fire" signal FF at the output of AND gate 36. The flash fire signal is applied via a flash drive circuit 38 to initiate a flash illumination by flash apparatus 26.

In accordance with this particular feature of the invention, the duration of the flash valid signal FV, determined by one-shot circuit 34, is chosen so as to commence preferably at the trailing edge of each vertical blanking interval and to end at a point in the video field signal that assures that the flash illumination initiated at any time during the flash valid period will be substantially completed before the XSG signal, occurring in the next vertical blanking interval, initiates the process of converting the captured video image on the image sensor in the video camera 12 into a video field signal.

The reason for this can best be explained with reference to the signal timing diagram of FIG. 2 which illustrates the operation of the invention in connection with a conventional video camera generating field interlaced video signals In this type of camera, transfer control signals XSG-1 and XSG-2 cause an image captured on interleaved lines of photosites in the image sensor to be transferred to video signal generating circuits during alternate vertical blanking intervals 50. This generates alternating image fields 1a,2a,1b,2b, and so on, such that any successive pair of fields constitutes a full resolution image frame is capable of being stored in image store apparatus 20 for subsequent display on monitor 22. If desired, the stored image may be comprised of only a single field, although some loss of vertical resolution would result. In a non-interlace system, only a single XSG signal is employed and image transfer processing occurs for the full image at every vertical blanking interval 50.

If flash apparatus 26 is energized during an interval that spans an XSG pulse, as illustrated by the dotted flash signal 52 spanning signal XSG-1, the initial portion $f_1$ of the flash image exposure on those sensor photosites controlled by signal XSG-1 will appear in image field 1a and the terminal portion $f_2$ will appear in image field 1b. However, the full flash image exposure on the sensor photosites controlled by signal XSG-2 will appear in image field 2a. If image store apparatus stores a full frame image consisting of two successive fields, either 1a and 2a, or 2a and 1b, the result will be an image on display monitor 22 with uneven illumination in alternate lines of the image and flicker would be aPparent. Similarly, if only a single frame were stored, the results would be erratic since either a partial (low illumination) exposure or full exposure image would be stored and displayed. In the case of a non-interlace system, an under-illuminated video image resulting from partial flash segment $f_2$ would occur.

To avoid this difficulty, a flash valid signal FV is generated by one-shot circuit 34 to create intervals "x" during each video signal image field, in which flash apparatus 26 is allowed to be fired, which are separated by intervening intervals "y" in which flash initiation is prohibited. Since image signal processing in the video camera image sensor, i.e. transfer of the image from sensor photosites, occurs during vertical blanking intervals, one-shot circuit 34 is preferably triggered by the rising edge 50a of the vertical blanking signal V to generate a low active segment of signal FV for a limited duration ending at a point 55 in the video field signal to assure that a flash illumination of a predetermined maximum duration, e.g. 3 ms, initiated at any time during the low active segment x of signal FV will be extinguished prior to commencement of the next vertical blanking interval at 50b. Assuming a total field period (blanking interval plus image field) of 16.7 ms, a flash valid segment x of 12.2 ms leaves a period of 4.5 ms for segment y (1.5 ms for the vertical blanking portion of the interval and 3.0 ms at the end of the image field) during which flash is prohibited thus preventing any overlap of the flash exposure on the subject at the time the captured video image being processed out of the image sensor in the video camera 12. As can be seen in FIG. 2, a flash energization 56 initiated by the coincidence of the falling edge 57a of signal PC near the end of the active segment x of signal FV is extinguished by the time of the beginning 50b of the next vertical blanking interval. It will be apparent that arrival of a PC signal at any time during segment x of signal FV, and indicated by the limits 58a and 57a, will initiate a flash fire signal FF sufficiently far in advance of the next successive blanking interval to assure completion of the flash illumination prior to processing of the captured video image in the camera 12 also triggers one-shot 36 to generate a 16.7 ms enable store low active signal ES. Signal ES is low active for at least 16.7 ms in this example to assure that regardless of when it is triggered it will still be low active when the next vertical blanking signal arrives from the output of sync strip circuit 32 which then causes image store signal IS to be sent from AND circuit 42 to image store apparatus 20. Image store apparatus 20 then operates in conventional manner to store the desired image signal, e.g. field 2a or a complete interlace frame of fields 2a and 1b, as previously described.

It will be noted that the PC flash request signal which may initially go low active prior to the rising edge 55 of signal FV is still low active on the falling edge 59 of the next flash valid segment of signal FV. However, although this would generate a second flash fire signal out of AND circuit 36, a second flash illumination is not generated since normal recharge time constants of flash apparatus are sufficiently long as to prevent a recurring flash illumination in such a short time interval.

The synchronizing arrangement of this invention enables the use of a moderately long shutter open time, such as 1/30 second For this reason, ambient light in a photographic studio can be advantageously used to allow the mix of continuous daylight and fill flash to make photographs.

It will be appreciated that there has been described a simple and effective flash synchronization method and apparatus for simultaneous recording of images in a film and video camera system that allows the use of conventional camera without any internal modification of the cameras, particularly the video camera The invention has been described in detail with particular reference to a presently preferred embodiment, but it will be understood that variations and modifications can be effected within the spirit and scope of the invention.

What is claimed is:

1. An image recording system for simultaneously recording images of a subject in electronic and photosensitive media, comprising:
    a photographic camera for capturing a photographic image of said subject on said photosensitive medium, said photographic camera including means for supplying a flash request signal;
    a video camera for generating a video signal comprised of alternating video image fields and vertical blanking intervals, said camera including solid state imaging means for capturing a video image of said subject and means for processing said captured image during said vertical blanking intervals into successive fields of video image signals;
    means for illuminating said subject with a flash illumination of a predetermined maximum duration;
    means for separating vertical blanking signals from said camera video signal; and
    flash synchronizing means responsive to said separated vertical blanking signals for enabling initiation of said flash illumination only during a limited time interval following each successive vertical blanking interval, said limited time interval ending at a point in the video signal image field that assures that a flash illumination of said maximum duration initiated at any time in said limited time interval will be substantially completed before the processing of the captured image from said imaging means is initiated in the next successive vertical blanking interval.

2. The image recording system of claim 1, in which said synchronizing means includes means responsive to said vertical blanking signals for generating a flash valid signal active only during said limited time interval and means responsive to time conicdent occurrence of said flash valid and flash request signals to generate a flash fire signal, said flash illumination means being responsive to said flash fire signal for initiating said flash illumination.

3. The system of claim 1 further including image store means for storing video image information from at least one video image field from said video camera; and means responsive to said flash synchronizing means for enabling said image store means to store at least the first video field following the field in which said flash is enabled.

4. The system of claim 3 in which said image store means, when enabled in response to the flash synchronizing means stores a complete frame of two successive image fields commencing with the first field following the field in which said flash is enabled.

5. Apparatus for use in synchronizing flash illumination by flash apparatus in an image recording system which simultaneously records an image of a subject in photographic film and video cameras, the apparatus comprising:
    means responsive to a vertical blanking signal in the video signal from the video camera for generating a flash valid signal ending at a predetermined point prior to the next successive vertical blanking interval;
    means responsive to simultaneous presence of said flash valid signal and a flash request signal from the photographic film camera for generating a flash fire signal adapted to be applied to said flash apparatus to initiate said flash illumination;
    the predetermined ending point of the flash valid signal being such as to assure substantial completion of the flash illumination prior to commencement of the next successive vertical blanking interval.

6. The apparatus of claim 5 for a system further including an image store means wherein the apparatus further includes means responsive to the flash valid signal for enabling storage by the image store means of at least one full field of image information from the video camera immediately following the field in which initiation of said flash illumination occurs.

7. A method of recording an image of a subject substantially simultaneously on electronic and photosensitive mediums with a single flash illumination comprising the steps of:

initiating the recording of a photographic image of said subject on a photosensitive medium;

generating a flash request signal for the purpose of initiating a flash illumination of said subject to be effective during recording of the photographic image;

capturing a video image of said subject on an electronic image sensor of the electronic medium;

transferring the captured image from the sensor into a video signal processing circuit during vertical blanking intervals in the video signal;

synchronizing the flash illumination with the video signal by generating a flash valid signal only during a limited time interval in a video field that assures that any flash illumination on the subject will be substantially completed prior to transfer of a field of video image from the image sensor during the next successive vertical blanking interval;

generating a flash request signal; and initiating flash illumination on the subject only during coincidence of the flash request and flash valid signals.

* * * * *